United States Patent [19]

Simpson

[11] 4,192,394

[45] Mar. 11, 1980

[54] ALARM SYSTEM FOR PLATFORM SCALE

[76] Inventor: Cullie M. Simpson, Rte. 3, Marshville, N.C. 28103

[21] Appl. No.: 919,374

[22] Filed: Jun. 26, 1978

[51] Int. Cl.² .................... G01G 19/02; G01G 23/18
[52] U.S. Cl. .................................. 177/45; 177/134; 200/86 A; 340/38 R; 340/666
[58] Field of Search .............. 177/1, 45, 133, 134, 177/135, 161; 340/366, 38 R, 666, 674, 686, 568, 51; 200/86 A, 86 R, 85 R

[56] References Cited

U.S. PATENT DOCUMENTS

| 668,689 | 2/1901 | Reed | 177/45 X |
|---|---|---|---|
| 2,083,783 | 6/1937 | Haegele | 177/134 X |
| 2,746,738 | 5/1956 | Reiser | 177/134 X |
| 3,026,508 | 3/1962 | Muller | 340/666 X |
| 3,842,922 | 10/1974 | Fagin | 177/134 X |

FOREIGN PATENT DOCUMENTS 1112644  8/1961  Fed. Rep. of Germany ........... 177/134

Primary Examiner—Joseph W. Hartary
Attorney, Agent, or Firm—Bell, Seltzer, Park & Gibson

[57] ABSTRACT

To prevent inaccurate weighing on a platform scale in the event that a driver of a motor vehicle has purposefully or inadvertently positioned his vehicle with one or more of the vehicle wheels located off of the weighing platform, the platform scale is provided with an alarm system which comprises a weight responsive mat switch located in the roadbed along the perimeter of the weighing platform, a signal located in the proximity of the scale operator, and means interconnecting the mat switch and the signal for actuating the signal and alerting the scale operator in response to one or more wheels of the motor vehicle coming into engagement with the mat switch.

7 Claims, 5 Drawing Figures

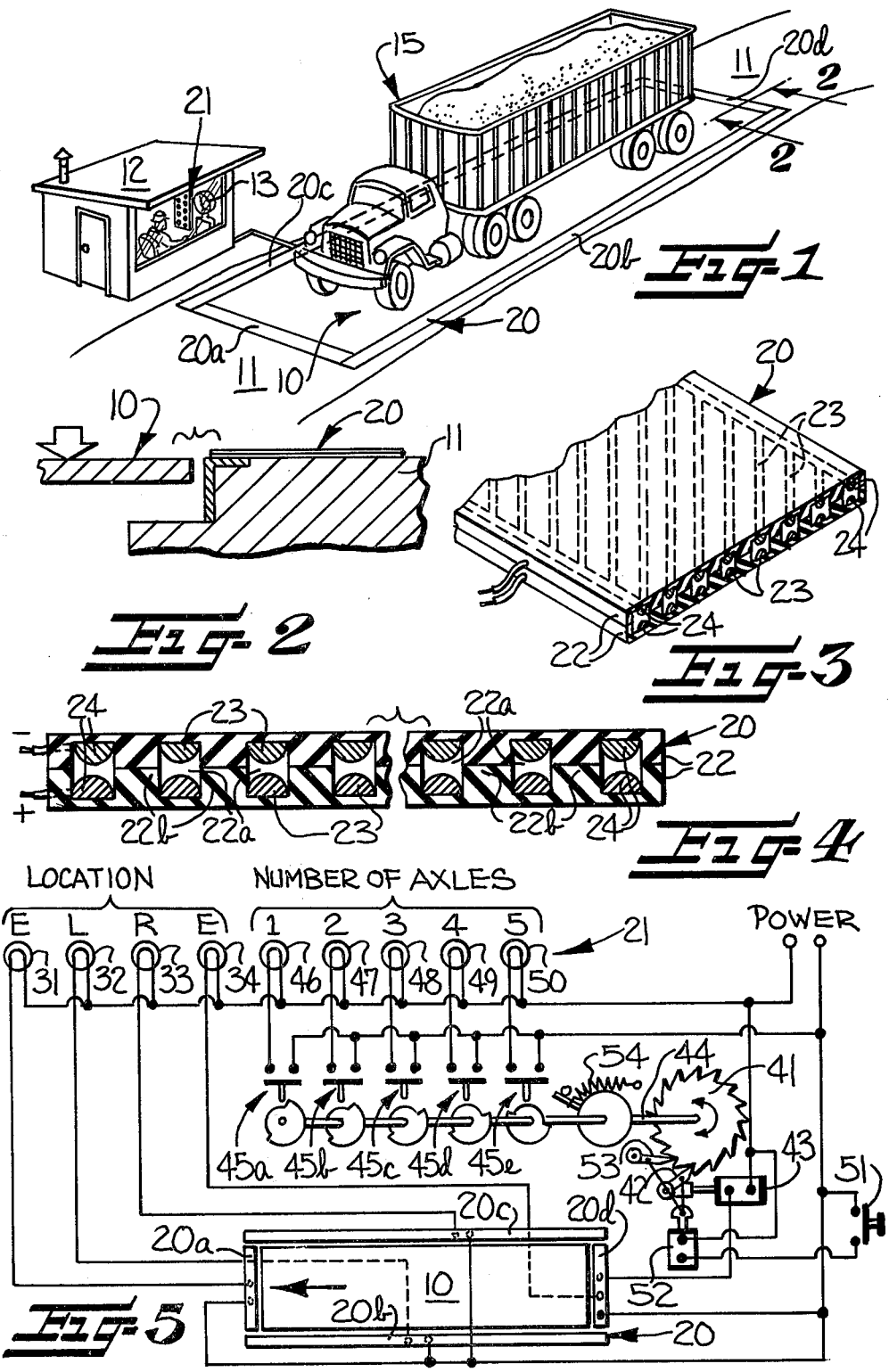

ALARM SYSTEM FOR PLATFORM SCALE

FIELD OF THE INVENTION

This invention relates to weighing scales, and in particular, to an improvement for use with platform weighing scales of the type conventionally employed for weighing motor vehicles.

BACKGROUND OF THE INVENTION

There are numerous applications where platform scales are used to obtain the net weight of the load carried by a truck or other motor vehicle. For example, in the buying and selling of bulk grain, the sales or purchase price is usually determined by calculating the net weight of the grain carried by the truck. Similarly, household moving companies usually calculate their moving charges based upon the net weight of the load carried by the moving van.

In these applications, the net weight of the load is determined by weighing the vehicle twice, once when fully loaded to obtain the gross weight of the vehicle, and once when empty to obtain the unloaded weight or tare weight of the vehicle. From these two weights, the net weight of the load may be readily calculated by subtraction.

In this type of weighing operation, the driver of the motor vehicle being weighed may sometimes purposefully or inadvertently position his vehicle for weighing with one or more of the wheels located off of the weighing platform. In such event, the weight registered by the scale would be lighter than the actual weight of the vehicle. If this occurs when the unloaded or tare weight is being determined, the net weight of the load determined from these weighings will be inaccurately high.

A platform scale includes a weighing platform which is flush mounted in the roadbed to facilitate driving the vehicle onto the weighing platform and which is typically about ten feet wide by thirty to sixty feet in length. The scale operator is usually located in a scale house positioned to one side of the weighing platform, and from this vantage point, it is often difficult for the scale operator to ascertain whether the vehicle is properly positioned on the weighing scale. Since the operator's view is obstructed by the motor vehicle, it may be extremely difficult for the scale operator to detect an improperly positioned vehicle. Also, particularly with relatively long tractor trailer vehicles with tandem rear axles, the motor vehicle may be positioned on the scale with one or more of the rearmost axles located off of the weighing platform. It is difficult for the scale operator to detect this from his vantage point in the scale house. Even if the scale operator has a clear vantage point of all portions of the weighing platform, the routine nature of the weighing operation may frequently give rise to carelessness on the part of the scale operator whereby improperly positioned vehicles may go undetected during weighing.

From the foregoing, it should be apparent that the need exists for a device and method for insuring that a motor vehicle is properly positioned on the weighing platform of a platform scale prior to weighing, and it is an important object of the present invention to provide a device and method for satisfying this need.

It is a further object of this invention to provide a device and method of the type described which may be readily installed and used on existing platform scales without requiring substantial modification thereto.

SUMMARY OF THE INVENTION

These and other objects are accomplished in accordance with this invention by the provision of an alarm system which is adapted to alert the operator of a platform scale in the event that the driver of a motor vehicle has purposefully or inadvertently positioned his vehicle with one or more of the wheels located off of the weighing platform. In accordance with this invention a signal is located in the proximity of the scale operator, and a weight responsive mat switch is located in the roadbed of the weighing scale closely surrounding all sides of the weighing platform. The weight responsive mat switch is operably connected to the signal for actuating the signal when one or more wheels of a motor vehicle come into contact with the mat switch.

Preferably, the mat switch has a width of at least about six inches and the innermost edge portions of the mat are located substantially coextensive with the juncture between the weighing platform and the surrounding roadbed. In this manner, the mat provides a broad area of contact closely adjacent all sides of the weighing platform for alerting the scale operator should any portion of the wheels of the vehicle not be located wholly on the weighing platform.

Most desirably, the weight responsive mat switch is responsive only to weights in excess of about 250 pounds. This avoids erroneously alerting the operator of the scale in the event that a person or relatively light weight object should engage the mat switch.

The signal is preferably in the nature of an audible or visual alarm located in the scale house closely adjacent to the weight indicator. The signal may optionally additionally include suitable means for indicating the number of times a motor vehicle wheel axle has come into engagement with the mat switch as the vehicle is being driven into position on the weighing platform. This will enable the scale operator to readily determine when a vehicle has been positioned fully onto the weighing platform. The scale operator can readily ascertain the number of axles for the vehicle, and can compare this to the number of indications registered by the signal to determine whether one or more of the rearmost axles still remains off of the weighing platform.

Some of the objects, features and advantages of the invention having been described, others will become apparent as the description proceeds when taken in conjunction with the accompanying drawings, in which—

BRIEF DESCRIPTION OF THE DRAWINGS

FIG. 1 is a perspective view showing a platform scale which is provided with an alarm system in accordance with this invention;

FIG. 2 is a cross sectional view taken substantially along the line 2—2 of FIG. 1 and showing the weight responsive mat switch located along the perimeter of the weighing platform;

FIG. 3 is a schematic perspective view of the weight responsive mat switch;

FIG. 4 is a cross sectional view of the weight responsive mat switch; and

FIG. 5 is a schematic wiring diagram of the controls for the alarm system.

DESCRIPTION OF ILLUSTRATIVE EMBODIMENT

Referring now more particularly to the drawings, FIG. 1 illustrates a weighing station of the type typically used for weighing large motor vehicles such as trucks and the like. The weighing station includes a weighing platform 10 which is located in a surrounding roadbed 11 with the upper surface of the weighing platform 10 substantially flush with the roadbed 11 to facilitate driving a motor vehicle onto the weighing platform. The weighing platform is typically about ten feet in width and about thirty to sixty feet in length to accommodate relatively large motor vehicles, such as the tractor trailer truck 15 illustrated in FIG. 1. A scale house 12 is located to one side of the elongate weighing platform and houses the indicator apparatus 13 from which the scale operator who is located in the scale house can determine the weight of the vehicle positioned on the weighing platform. As is conventional, the weighing platform 10 extends over an underlying pit with the side edges of the platform terminating closely adjacent to and substantially flush with the surrounding roadbed.

A weight responsive mat switch 20 is located on the roadbed 11 of the weighing scale closely surrounding all sides of the weighing platform. More particularly, it will be noted that innermost edge portions of the mat switch 20 are located substantially coextensive with the juncture between the weighing platform 10 and the surrounding roadbed 11.

A signal device, generally indicated by the reference character 21, is located inside the scale house, and is electrically connected to the mat switch 20 for alerting the scale operator in the event that a motor vehicle is improperly positioned for weighing with one or more of the vehicle wheels located off of the weighing platform. The signal device 21 may suitably include visual indicators such as lamps, audible indicators such as buzzers or bells, or both visual and audible indicators. The signal device 21 is interconnected with the mat switch by suitable electrical circuitry so that the signal will be activated in response to one or more wheels of the motor vehicle coming into engagement with the mat switch 20.

Preferably, the mat switch 20 has a width of at least about six inches and innermost edge portions of the mat switch are located substantially coextensive with the juncture between the weighing platform 10 and the surrounding roadbed 11. By this arrangement, a broad area of contact is provided closely adjacent all sides of the weighing platform so that the scale operator will be alerted in the event that any portion of the wheels of the motor vehicle should be positioned off of the weighing platform. In this regard, it has been determined that relatively narrow weight sensor devices such as the conventional hose type sensors do not provide an adequate area of contact. It is extremely important in the present invention to provide for sensing a vehicle wheel at the very juncture between the weighing platform and the surrounding roadbed since the improper positioning of only a portion of a vehicle tire on the surrounding roadbed may result in substantial inaccuracies in weighing. The conventional hose type of sensor has been found to be unacceptable for this purpose because of its very narrow width and the difficulty in positioning it at a location sufficiently close to the juncture between the roadbed and weighing platform. Further, it has been found that the hose type of sensor is susceptible to being moved or displaced as a result of being continually contacted by the motor vehicle wheels as vehicles are driven onto and off of the weighing platform. Further, because of the narrow area of contact it is fairly easy for a vehicle to be positioned with the wheels located off of the weighing platform and outwardly beyond the sensor, thus defeating the alarm.

Referring in more detail to the weight responsive mat switch 20, as illustrated in FIGS. 3 and 4, the mat switch is of the electrical type and includes a pair of treads 22 positioned and secured together in opposing relation to one another. The treads 22 are formed of rubber or other suitable resilient but electrically non-conducting material. The opposing faces of the treads 22 have recessed elongate grooves 22a formed therein extending diagonally across the width dimension of the treads with intervening rib portions 22b being defined between successive grooves 22a. The ribs receive respective electrical conductors 23 in the form of elongate bars. The conductors in each respective tread are electrically connected to one another, preferably by common conductor bars 24 extending along the longitudinal edges of the mat switch.

As best seen in FIG. 4, the uppermost surface portions of the conductor bars 23 and 24 are recessed below the level of the adjacent rib portions 22b and are thus normally positioned out of contacting relation with one another. However, because of the resilient nature of the tread material, when a sufficient weight is applied to the mat switch, the conductor bars are deflected into contacting relation with one another thus completing an electrical circuit therebetween.

Preferably, the mat switch is so constructed that a weight in excess of about 250 pounds is necessary to cause the conductor bars to be deflected into contacting relation with one another. This avoids erroneously alerting the operator of the scale in the event that a person or a relatively lightweight object engages the mat switch. This is accomplished by providing a fairly substantial spacing or tolerance between the respective conductor bars and consequently requiring a substantial amount of deflection of the bars to bring them into conducting contact. By avoiding close critical space tolerances as are often required in lighter duty mat switches, the usable life of the mat is increased also.

FIG. 5 illustrates a suitable electrical circuit arrangement for use in the present invention. As illustrated therein, the mat switch 20 includes four separate elongate segments 20a, 20b, 20c, 20d located along the respective sides and ends of the weighing platform. The four segments 20a, 20b, 20c, 20d are individually connected to respective signal lights 31, 32, 33 and 34 located in the scale house and suitably labeled so as to indicate to the scale operator the particular location on the weighing scale which is being contacted by the vehicle wheels. While lights are used in the illustrated embodiment for visually signalling to the scale operator, it will be understood, as noted earlier, that audible signal means may be used if desired instead of or in addition to the visual signal means.

In addition, there may be provided, as illustrated in FIG. 5, means for indicating to the scale operator the number of wheel axles of the motor vehicle which have come into engagement with the mat switch as the vehicle is being driven into position on the weighing platform. This additional feature serves to enable the scale operator to readily determine when a vehicle has been positioned fully onto the weighing platform with all of its wheel axles located on the weighing platform. In this regard, it will be appreciated by those familiar with the weighing operation that when relatively long vehicles are being weighed, it is sometimes possible for the vehicle driver to position his vehicle with the rearmost axle of the tandem rear axles located off of the weighing platform. This may occur for example where the vehicle stops with the two rear tandem axle positioned astraddle the weight responsive sensor. By providing means for indicating to the scale operator how many axles have been driven onto the weighing platform, he can readily ascertain whether the vehicle has been fully driven onto the weighing platform.

In the control circuit illustrated in FIG. 5, this is accomplished with the use of a resettable stepping relay 40 of known construction. Stepping relay 40 includes a ratchet wheel 41 which is adapted to be advanced incrementally by a stepping pawl 42 which in turn is actuated by a solenoid 43. Movement of the ratchet wheel 41 rotates a shaft 44 upon which there is mounted a series of cam actuated switches 45a through 45e. The cams are so adjusted on the shaft 44 as to successively close the respective switches with each successive actuation of the solenoid 43. The respective cam actuated switches 45a through 45e are connected to indicator lights 46, 47, 48, 49 and 50, which are located in the scale house 12 adjacent to the indicator lights 31 through 34, and which are suitably labeled to indicate the number of wheel axles which have crossed the mat switch 20 located on the entry end of the weighing platform. In this regard, it will be noted that the solenoid 43 is electrically connected to the mat switch segment 20d on the entry end of the weighing platform for actuating the solenoid each time the mat switch is closed. Thus, as a vehicle drives onto the weighing platform, the indicator lights 46 through 50 will be successively illuminated each time a wheel axle comes into engagement with the entry mat switch segment 20d.

In order to reset the mechanism for a subsequent weighing and extinguish the signal lights 46 through 50, the scale operator actuates a reset switch 51, which in turn is connected to a reset solenoid 52 which actuates a reset pawl 53 in the resettable stepping relay 40. The reset solenoid removes the reset pawl 53 from engagement with the ratchet 51 and allows the shaft 44 to be rotated by a biasing spring 54 to the original starting position.

In the drawings and specification, there have been set forth preferred embodiments of the invention, and although specific terms are employed, they are used in a generic and descriptive sense only and not for purposes of limitation.

That which is claimed is:

1. A platform scale of the type which includes an elongate weighing platform of a length and width adapted to accommodate a motor vehicle thereon and which is located in a surrounding roadbed to facilitate driving the motor vehicle onto the weighing platform, and in combination with said platform scale, an alarm system for alerting the operator of the scale in the event that the driver of a motor vehicle has purposefully or inadvertently positioned his vehicle with one or more of the vehicle wheels located off of the weighing platform so as to obtain a reduced tare weight when weighing, said alarm system comprising a weight responsive mat switch located in the roadbed and positioned closely surrounding all sides of the weighing platform for being engaged by the wheels of the motor vehicle when any portions of the wheels are improperly positioned and located off of the weighing platform, a signal located in the proximity of the scale operator, and means operatively interconnecting said mat switch and said signal for actuating the signal and alerting the scale operator in response to one or more wheels of the motor vehicle coming into engagement with said mat switch.

2. Apparatus according to claim 1 wherein said mat switch has a width of at least about six inches and innermost edge portions of the mat switch are located substantially coextensive with the juncture between the weighing platform and the surrounding roadbed so that the mat switch provides a broad area of contact closely adjacent all sides of the weighing platform for alerting the scale operator should any portion of the wheels of the vehicle not be located wholly on the weighing platform.

3. Apparatus according to claim 1 wherein said weight responsive mat switch is responsive only to weights in excess of about 250 pounds so as to avoid erroneously alerting the operator of the scale in the event that a person or a relatively light weight object engages the mat switch.

4. Apparatus according to claim 1 wherein said alarm system additionally includes means associated with said mat switch for indicating to the scale operator the number of wheel axles of the motor vehicle which have come into engagement with the mat switch as the vehicle is being driven into position on the weighing platform to thereby enable the scale operator to readily determine when a vehicle has been positioned fully onto the weighing platform with all of its wheel axles located on the weighing platform.

5. A platform scale of the type which includes an elongate weighing platform of a length several times greater than its width for accommodating relatively large motor vehicles such as tractor trailer trucks and the like thereon, said weighing platform being located substantially flush in a surrounding roadbed to facilitate driving the motor vehicle onto the weighing platform, and said scale including a scale house located adjacent to the weighing platform for accommodating the operator of the scale, and in combination with said platform scale, an alarm system for alerting the operator of the scale in the event that the driver of a motor vehicle has purposefully or inadvertently positioned his vehicle with one or more of the vehicle wheels located off of the weighing platform so as to obtain a reduced tare weight when weighing, said alarm system comprising a weight responsive mat switch located on the roadbed and positioned closely surrounding all sides of the elongate weighing platform for being engaged by the wheels of the motor vehicle when any portions of the wheels are improperly positioned and located off of the weighing platform, a signal located in the scale house, and means operatively interconnecting said mat switch and said signal for activating the signal and alerting the scale operator in response to one or more wheels of the motor vehicle coming into engagement with said mat switch.

6. Apparatus according to claim 5 wherein said alarm system additionally includes indicator means located in said scale house and operatively connected to said mat switch for indicating to the scale operator the number of wheel axles of the motor vehicle which have crossed the mat switch as the vehicle is being driven into position on the weighing platform to thereby enable the scale operator to readily determine when a vehicle has been positioned fully onto the weighing platform with all of its wheel axles located on the weighing platform.

7. Apparatus according to claim 6 wherein said indicator means comprises a series of lamps corresponding in number to the maximum number of wheel axles to be encountered on the motor vehicles being weighed, means associated with said lamps for successively illuminating respective ones of the lamps each time the mat switch is engaged by a wheel axle as the vehicle is being driven into position on the weighing platform to thereby indicate to the scale operator the number of wheel axles of the vehicles which have been driven onto the weighing platform, and reset means for extinguishing the lamps upon completion of weighing to ready the indicator means for a subsequent weighing.

* * * * *